(12) United States Patent
Koslowski et al.

(10) Patent No.: US 10,413,974 B2
(45) Date of Patent: Sep. 17, 2019

(54) INTUITIVE, ADAPTIVE DRILLING FUNCTION

(71) Applicant: Hilti Aktiengesellschaft, Schaan (LI)

(72) Inventors: Oliver Koslowski, Puergen (DE);
Markus Forstner, Landsberg (DE);
Egon Koenigbauer, Eichendorf (DE);
Michael Fuchs, Bad Woerishofen (DE);
Stefan Groer, Graben (DE)

(73) Assignee: Hilti Aktiengesellschaft, Schaan (LI)

( * ) Notice: Subject to any disclaimer, the term of this patent is extended or adjusted under 35 U.S.C. 154(b) by 578 days.

(21) Appl. No.: 14/911,201

(22) PCT Filed: Aug. 8, 2014

(86) PCT No.: PCT/EP2014/067090
§ 371 (c)(1),
(2) Date: Feb. 9, 2016

(87) PCT Pub. No.: WO2015/018930
PCT Pub. Date: Feb. 12, 2015

(65) Prior Publication Data
US 2016/0200000 A1 Jul. 14, 2016

(30) Foreign Application Priority Data

Aug. 9, 2013 (EP) ..................... 13179827

(51) Int. Cl.
*B23B 35/00* (2006.01)
*B23B 45/02* (2006.01)
(Continued)

(52) U.S. Cl.
CPC .............. *B23B 35/00* (2013.01); *B23B 45/02* (2013.01); *B23B 51/0406* (2013.01); *B25F 5/00* (2013.01);
(Continued)

(58) Field of Classification Search
CPC ..... B25B 21/008; B23B 45/008; B23B 45/02; B23B 35/00; B23B 51/0406;
(Continued)

(56) References Cited

U.S. PATENT DOCUMENTS 3,896,360 A * 7/1975 Meyer ................... B23Q 35/06
318/39
4,382,188 A * 5/1983 Cronin .................... F16H 15/38
290/1 C
(Continued)

FOREIGN PATENT DOCUMENTS

DE 102009000515 8/2010
EP 2324961 5/2011
(Continued)

*Primary Examiner* — Robert F Long
(74) *Attorney, Agent, or Firm* — Davidson, Davidson & Kappel, LLC

(57) ABSTRACT

A method to control a power tool (1), especially a handheld core drilling machine, includes a drive (10) to drive a tool (30) and a control unit (40) for when a workpiece (W) is being processed. The method encompasses the following method steps:
setting the rotational speed of the drive at a first value;
measuring a first power consumption value for the drive;
setting a threshold value for the power consumption of the drive; and
increasing the rotational speed of the drive to a second value if the power consumption of the drive (10) exceeds the threshold value due to an increase in the drive load.
The power tool includes a drive (10) to drive a tool (3) and a control unit (40) to control at least the rotational speed of the drive.

17 Claims, 2 Drawing Sheets

(51) Int. Cl.
  *B25F 5/00* (2006.01)
  *B23B 51/04* (2006.01)
  *B28D 1/04* (2006.01)
  *B28D 7/00* (2006.01)

(52) U.S. Cl.
  CPC ............ *B28D 1/041* (2013.01); *B28D 7/005* (2013.01); *B23B 2226/75* (2013.01); *B23B 2260/128* (2013.01)

(58) Field of Classification Search
  CPC . B23B 2260/128; B23B 2226/75; B25F 5/00; B28D 1/041; B28D 7/005
  USPC ................. 173/2, 90, 93, 176–178, 216
  See application file for complete search history.

(56) References Cited

U.S. PATENT DOCUMENTS

| | | | | |
|---|---|---|---|---|
| 4,476,395 A * | 10/1984 | Cronin | ............... | H02K 16/00 290/4 C |
| 5,558,476 A | 9/1996 | Uchida et al. | | |
| 7,494,437 B2 * | 2/2009 | Chen | ............... | B25B 21/02 173/216 |
| 8,333,251 B2 | 12/2012 | Cecchin | | |
| 9,162,331 B2 * | 10/2015 | Tang | ............... | B23P 19/066 |
| 2005/0199404 A1 * | 9/2005 | Furuta | ............... | B25B 21/00 173/48 |
| 2006/0090913 A1 * | 5/2006 | Furuta | ............... | B25B 21/00 173/48 |
| 2007/0217879 A1 * | 9/2007 | Larsson | ............... | B25H 1/0064 408/129 |
| 2008/0223894 A1 * | 9/2008 | Cruise | ............... | B25C 1/008 227/2 |
| 2011/0114347 A1 * | 5/2011 | Kasuya | ............... | B25D 11/005 173/11 |
| 2011/0132959 A1 * | 6/2011 | Hlinka | ............... | B25C 1/008 227/8 |
| 2011/0284255 A1 * | 11/2011 | Ookubo | ............... | B23B 45/02 173/109 |
| 2012/0199372 A1 * | 8/2012 | Nishikawa | ............... | B25B 21/02 173/132 |
| 2013/0062088 A1 * | 3/2013 | Mashiko | ............... | B25B 21/02 173/2 |
| 2013/0126202 A1 * | 5/2013 | Oomori | ............... | B25B 21/00 173/217 |
| 2015/0144365 A1 * | 5/2015 | Hirabayashi | ............... | B25B 21/02 173/2 |
| 2016/0193673 A1 * | 7/2016 | Yoshida | ............... | B23D 47/12 30/388 |
| 2017/0170774 A1 * | 6/2017 | Selfors | ............... | B25F 5/00 |

FOREIGN PATENT DOCUMENTS

| | | | | |
|---|---|---|---|---|
| EP | 2324961 | A2 * | 5/2011 | ......... B25D 11/005 |
| EP | 2391483 | B1 | 6/2013 | |

* cited by examiner

INTUITIVE, ADAPTIVE DRILLING FUNCTION

The present invention relates to a method to control a power tool, especially a handheld core drilling machine, comprising a drive to drive a tool and a control unit for when a workpiece is being processed.

The invention also relates to a power tool that uses this method.

The power tool can be, for instance, a core drilling machine used for core drilling.

BACKGROUND

A core drilling machine uses a cylindrical diamond-tipped drill bit to cut a ring-shaped groove into a workpiece that is to be processed in order to create a cylindrical drill core there which can then be removed in its entirety from the drilled hole after the completion of the core drilling procedure. The material that is to be processed can be, for example, concrete, masonry, stone or the like.

Such a core drilling device and an associated method to control this core drilling device are disclosed in German Preliminary Published Application DE 10 2009 000 015. According to this document belonging to the state of the art, the acceleration along a striking axis of a pneumatically striking handheld power tool is measured. The drive output of the handheld power tool is reduced if the measured acceleration is greater than a previously set threshold value. In this context, the threshold value is set in such a way that it is greater than the maximum acceleration values that occur during the operation of a handheld power tool that is striking onto a workpiece.

Core drilling, particularly using handheld core drilling machines, is a demanding work procedure and it requires a number of different actions during the individual work phases. These include, for example, adjusting the parameters of the core drilling machine to changing conditions or else varying the advancing speed of the tool (drill bit) into the material that is to be processed. In the case of handheld core drilling machines, in contrast to core drilling machines mounted on stands, there is the additional complicating factor, namely, that users have to hold, control and guide the core drilling machine with their hands. Since even handheld core drilling machines can usually be quite heavy and since the working position is seldom very comfortable for the user, that is to say, the working position is too low, too high or even above the head of the user, many problems can occur during the core drilling procedure as the users are trying to comply with all of the important parameters while performing the numerous tasks. Particularly in the early core drilling phase, that is to say, during the so-called spot-drilling, many difficulties can arise which can have a negative impact on the entire core drilling procedure and especially on the result of the core drilling.

SUMMARY OF THE INVENTION

It is an object of the present invention to provide a method to control a power tool comprising a drive to drive a tool and a control unit for when a workpiece is being processed. Another alternate or additional object of the present invention is to provide a power tool that uses this method. Using the method according to the invention as well as the power tool according to the invention overcomes the above-mentioned drawbacks and the processing of the material transpires more safely and more efficiently.

The present invention provides a method to control a power tool, especially a handheld core drilling machine, comprising a drive to drive a tool and a control unit for when a workpiece is being processed, encompassing the following method steps:

setting the rotational speed of the drive at a first value;
measuring a first power consumption value for the drive;
setting a threshold value for the power consumption of the drive; and
increasing the rotational speed of the drive to a second value if the power consumption of the drive exceeds the threshold value due to an increase in the drive load.

Moreover, a power tool is provided that uses this method and it comprises:

a drive to drive a tool; and
a control unit to control at least the rotational speed of the drive.

According to another embodiment of the present invention, it is advantageous to achieve an increase in the drive load by raising the contact force onto the tool. Since pressing the tool onto a material that is to be processed is associated with a higher resistance acting on the tool, this means that the drive output has to be increased accordingly in order for the drilling procedure to advance at a constant rate. For purposes of increasing the drive output, it is necessary to likewise raise the power consumption of the drive. Increasing the drive load by raising the contact force onto the tool can be achieved in an efficient manner in that a higher rotational speed of the drive and thus a greater drive output of the power tool are automatically made available whenever a greater load in the form of a contact pressure is acting on the tool.

It is likewise possible for the threshold value to be defined as a function of at least one parameter of the power tool. As a result, varying operating conditions such as, for instance, the temperature of the power tool, the age or state of wear of the power tool or of the tool, the size of the drill bit employed, the type of material to be processed or the like can be compensated for and a relatively constant response (increase of the rotational speed of the drive) of the power tool under different operating conditions can be achieved.

Moreover, it is also advantageous for the rotational speed of the drive to be increased to a second value as a function of the period of time during which the threshold value was exceeded and as a function of the magnitude of the threshold value. If, for example, a relatively low threshold value is set for the power consumption of the drive, then the power consumption of the drive has to exceed this threshold value for a relatively long period of time. Accordingly, if a high threshold value is set, then the power consumption of the drive only has to to exceed this high threshold value for a relatively short period of time before the rotational speed of the drive is increased to a second value. With this feature, it can be achieved that the rotational speed of the drive is not increased prematurely to a second value if the threshold value is of a relatively small magnitude.

BRIEF DESCRIPTION OF THE DRAWINGS

The invention will be explained in greater detail on the basis of advantageous embodiments, whereby the following is shown.

DETAILED DESCRIPTION

Figure 1:
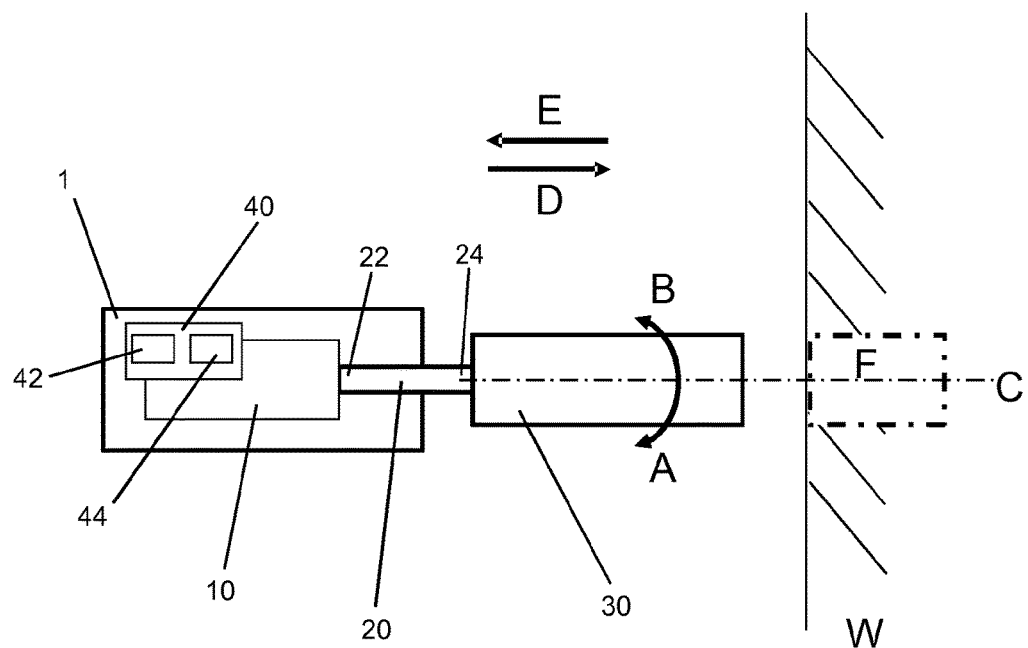
FIG. 1: a power tool according to the invention, having a drive, a control unit, a drive shaft and a tool.

FIG. 1 shows a handheld power tool for processing a material such as, for example, concrete, stone, masonry or the like.

The power tool 1 is configured in the form of a handheld core drilling machine and it comprises a drive 10, a drive shaft 20, a tool 30 in the form of a drill bit and a control unit 40.

The drive 10 is configured in the form of an electric motor although it is also possible to use any other suitable motor or drive modality.

The drive shaft 20 is connected to the drive 10 via a first drive end 22 and to the tool 30 configured as a drill bit 30 via a second drive end 24. The drive shaft 20 transmits the torque generated by the drive 10 to the drill bit 30. Owing to the generated torque and to a corresponding contact pressure that is exerted onto the drill bit 30, the drill bit 30 serves to drill a hole F into the material W.

The control unit 40 is positioned in the power tool 1 and connected to the drive 10. The control unit 40 comprises a first sensor 42 to detect several parameters of the power tool 1 as well as a second sensor 44 to detect the power consumption by the drive 10. Accordingly, the control unit 40 and the sensors 42, 44 serve to measure, control and regulate parameters and especially the rotational speed as well as the power consumption of the drive 10.

During the core drilling procedure, the drive 10 of the power tool 1 transmits a torque via the drive shaft 20 to the tool 30 configured as a drill bit, thus causing said tool 30 to make a rotational movement around the axis C in the direction of arrow A or B. In this context, the rotational speed of the drive 10 and of the drill bit 30 at the beginning of the drilling procedure corresponds to a relatively low value, that is to say, to a spot-drilling rotational speed or velocity. The drill bit 30 operated at the spot-drilling speed is then moved in the direction of arrow D towards the material W. In this process, the power tool 1 is held and guided by a user (not shown here). After completion of the core drilling procedure, the drill bit 30 is pulled in the direction of arrow E out of the hole B that was drilled into the material W.

As an alternative, it is also possible for the power tool 1 to be configured not as a handheld power tool 1 but instead as a power tool mounted on a stand. In this context, the power tool 1 is positioned on an appropriate power tool stand (not shown here) and is guided by it during the core drilling procedure.

The control method for a handheld core drilling machine 1 when a workpiece W is being processed is described below on the basis of FIG. 2.

Figure 2:
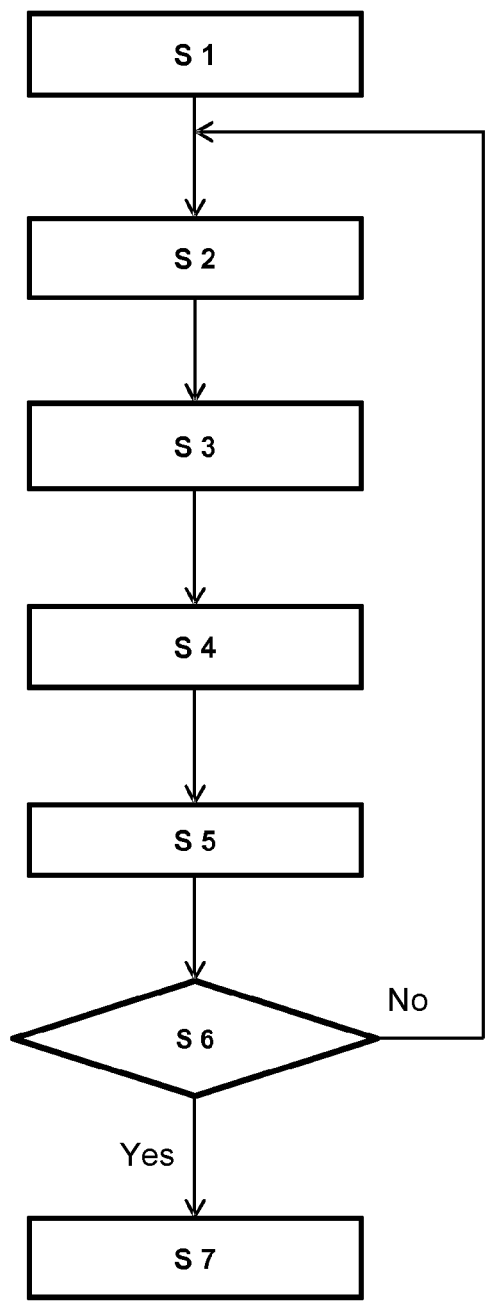
FIG. 2: a flow chart of the control method according to the invention to control a power tool when a workpiece is being processed.

As is shown in FIG. 2, the operation of the power tool 1 for a drilling procedure begins with step S1 in which the drive 10 of the power tool 1 is started. Then, in step S2, the rotational speed of the drive 10 is set at a value 1. In this context, the value 1 for the rotational speed of the drive matches a spot-drilling rotational speed or velocity. Here, the spot-drilling rotational speed or velocity is considerably lower than the rotational speed (hereinafter referred to as the rotational speed with the value 2) that is used for the actual core drilling procedure.

In step S3, the sensor 44 measures the power consumption of the drive 10 when the drive 10 is running at a rotational speed of the drive equal to the value 1, that is to say, at the spot-drilling rotational speed. The power consumption of the drive 10 is measured as a function of a number of operating parameters such as, for example, the temperature of the core drilling machine 1, the age or state of wear of the core drilling machine or of the tool 30, the size of the drill bit employed, the type of material W to be processed or the like. This means that the measured power consumption is measured and stored in the control unit 40 as a function of and in conjunction with these operating parameters. The drive 10 measures and stores the power consumption as a function of the operating parameters every time the core drilling machine 1 is started up (again).

Subsequently, in step S4, a threshold value or a limit value for the power consumption of the drive 10 is set and stored in the control unit 40. The threshold value or limit value for the power consumption of the drive 10 is set by the drive 10 as was already done for the measurement of the power consumption of the drive 10 as a function of a number of operating parameters such as, for example, the temperature of the core drilling machine 1, the age or state of wear of the core drilling machine 1 or of the tool 30, the size of the drill bit employed, the type of material W to be processed or the like.

In the subsequent step S5, the contact pressure which is applied by the user of the core drilling machine 1—and which is exerted from one side by the user (not shown here) and from the other side by the material W upon the tool 30 configured as a drill bit—is increased so that, after the spot-drilling phase (i.e. the rotational speed of the drive at the value 1), the actual core drilling (i.e. the rotational speed of the drive having the value 2) can be carried out. Since pressing the drill bit 30 onto a material W that is to be processed is associated with a higher resistance acting on the drill bit 30, this means that the drive output has to be increased accordingly by increasing the rotational speed as well as the torque in order for the drilling procedure to advance adequately. Owing to the rise of the drive output (that is to say, the rotational speed and/or the torque), the power consumption of the drive 10 is likewise increased.

In step S6, the sensor 44 is employed to check whether the threshold value set for the power consumption of the drive 10 was exceeded during a previously set period of time due to the increase in the contact pressure and due to the increase in the associated resistance on the drill bit 30. As already mentioned above, the period of time is a function of the set threshold value. In other words, the higher the threshold value, the longer the period of time during which the threshold value has to be exceeded before the drive output is increased.

If the threshold value for the power consumption of the drive 10 has been exceeded for the previously set period of time, then, in step S7, the rotational speed of the drive 10 is raised to a value 2. The value 2 of the rotational drive speed essentially matches the rotational speed of the drive for the actual core drilling procedure and is above the value 1 of the rotational speed of the drive for the spot-drilling procedure.

If the threshold value for the power consumption of the drive 10 has not been exceeded or if the threshold value has not been exceeded for the previously set period of time, then the rotational speed of the drive remains at the value 1 for the spot-drilling procedure.

What is claimed is:

1. A method to control a power tool having a drive to drive a tool and having a control unit for when a workpiece is being processed, the method comprising the following steps:

setting a rotational speed of the drive at a first value;

measuring a first power consumption value for the drive;
setting a threshold value for power consumption of the drive; and
increasing the rotational speed of the drive to a second value if the first power consumption value of the drive exceeds the threshold value due to an increase in the drive load;
wherein the rotational speed of the drive is increased to the second value as a function of the period of time during which the threshold value was exceeded and as a function of the magnitude of the threshold value; wherein the first value corresponds to a spot-drilling rotational speed and the second value corresponds to a core drilling procedure rotational speed.

2. The method as recited in claim 1 wherein the drive load is increased by raising a contact force onto the tool.

3. The method as recited in claim 1 wherein the threshold value is defined as a function of at least one parameter of the power tool.

4. The method as recited in claim 1 wherein the power tool is a handheld core drilling machine.

5. A power tool performing the method as recited in claim 1, comprising:
the drive to drive the tool; and
the control unit to control at least the rotational speed of the drive.

6. The method as recited in claim 1 wherein the first power consumption value of the drive is measured as a function of a temperature of the power tool.

7. The method as recited in claim 1 wherein the first power consumption value of the drive is measured as a function of an age or state of wear of the power tool.

8. The method as recited in claim 1 wherein the first power consumption value of the drive is measured as a function of a size of a drill bit of the tool.

9. The method as recited in claim 1 wherein the first power consumption value of the drive is measured as a function of a size of a type of material of the workpiece.

10. The method as recited in claim 1 wherein the first power consumption value of the drive is stored in the control unit.

11. The method as recited in claim 1 wherein as the magnitude of the threshold value increases, the period of time during which the threshold value has to be exceeded for the rotational speed of the drive to be increased to the second value also increases.

12. A method to control a power tool having a drive to drive a tool and having a control unit for when a workpiece is being processed, the method comprising the following steps:
setting a rotational speed of the drive at a first value;
measuring a first power consumption value for the drive;
setting a threshold value for power consumption of the drive; and
increasing the rotational speed of the drive to a second value if the first power consumption value of the drive exceeds the threshold value due to an increase in the drive load; wherein the rotational speed of the drive is increased to the second value as a function of the period of time during which the threshold value was exceeded and as a function of the magnitude of the threshold value;
wherein the first power consumption value of the drive is measured as a function of a temperature of the power tool.

13. A method to control a power tool having a drive to drive a tool and having a control unit for when a workpiece is being processed, the method comprising the following steps:
setting a rotational speed of the drive at a first value;
measuring a first power consumption value for the drive;
setting a threshold value for power consumption of the drive; and
increasing the rotational speed of the drive to a second value if the first power consumption value of the drive exceeds the threshold value due to an increase in the drive load; wherein the rotational speed of the drive is increased to the second value as a function of the period of time during which the threshold value was exceeded and as a function of the magnitude of the threshold value;
wherein the first power consumption value of the drive is measured as a function of an age or state of wear of the power tool.

14. A method to control a power tool having a drive to drive a tool and having a control unit for when a workpiece is being processed, the method comprising the following steps:
setting a rotational speed of the drive at a first value;
measuring a first power consumption value for the drive;
setting a threshold value for power consumption of the drive; and
increasing the rotational speed of the drive to a second value if the first power consumption value of the drive exceeds the threshold value due to an increase in the drive load; wherein the rotational speed of the drive is increased to the second value as a function of the period of time during which the threshold value was exceeded and as a function of the magnitude of the threshold value;
wherein the first power consumption value of the drive is measured as a function of a size of a drill bit of the tool.

15. A method to control a power tool having a drive to drive a tool and having a control unit for when a workpiece is being processed, the method comprising the following steps:
setting a rotational speed of the drive at a first value;
measuring a first power consumption value for the drive;
setting a threshold value for power consumption of the drive; and
increasing the rotational speed of the drive to a second value if the first power consumption value of the drive exceeds the threshold value due to an increase in the drive load; wherein the rotational speed of the drive is increased to the second value as a function of the period of time during which the threshold value was exceeded and as a function of the magnitude of the threshold value;
wherein the first power consumption value of the drive is measured as a function of a size of a type of material of the workpiece.

16. A method to control a power tool having a drive to drive a tool and having a control unit for when a workpiece is being processed, the method comprising the following steps:
setting a rotational speed of the drive at a first value;
measuring a first power consumption value for the drive;
setting a threshold value for power consumption of the drive; and
increasing the rotational speed of the drive to a second value if the first power consumption value of the drive exceeds the threshold value due to an increase in the drive load; wherein the rotational speed of the drive is increased to the second value as a function of the period of time during which the threshold value was exceeded and as a function of the magnitude of the threshold value;

wherein the first power consumption value of the drive is stored in the control unit.

17. A method to control a power tool having a drive to drive a tool and having a control unit for when a workpiece is being processed, the method comprising the following steps:

setting a rotational speed of the drive at a first value;

measuring a first power consumption value for the drive;

setting a threshold value for power consumption of the drive; and increasing the rotational speed of the drive to a second value if the first power consumption value of the drive exceeds the threshold value due to an increase in the drive load; wherein the rotational speed of the drive is increased to the second value as a function of the period of time during which the threshold value was exceeded and as a function of the magnitude of the threshold value;

wherein as the magnitude of the threshold value increases, the period of time during which the threshold value has to be exceeded for the rotational speed of the drive to be increased to the second value also increases.

* * * * *